(No Model.) 6 Sheets—Sheet 1.

G. E. DE FREEST & G. W. WYNKOOP.
PACKET FOLDING MACHINE.

No. 377,669. Patented Feb. 7, 1888.

Witnesses:
W. A. Ruff
H. A. Daniels

Inventors:
George E. De Freest &
George W. Wynkoop
by Thomas P. Simpson
Atty

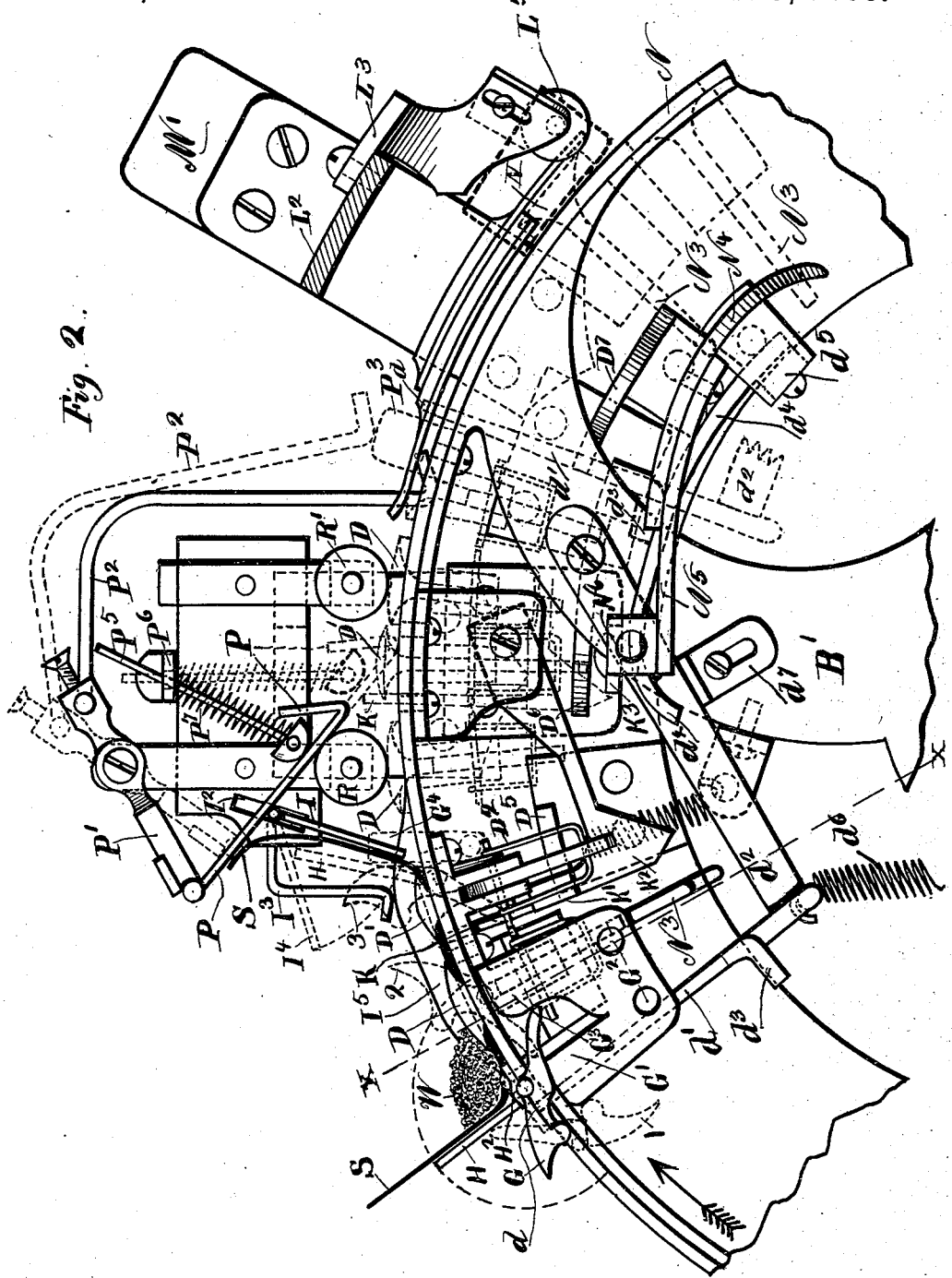

(No Model.) 6 Sheets—Sheet 3.
G. E. DE FREEST & G. W. WYNKOOP.
PACKET FOLDING MACHINE.
No. 377,669. Patented Feb. 7, 1888.
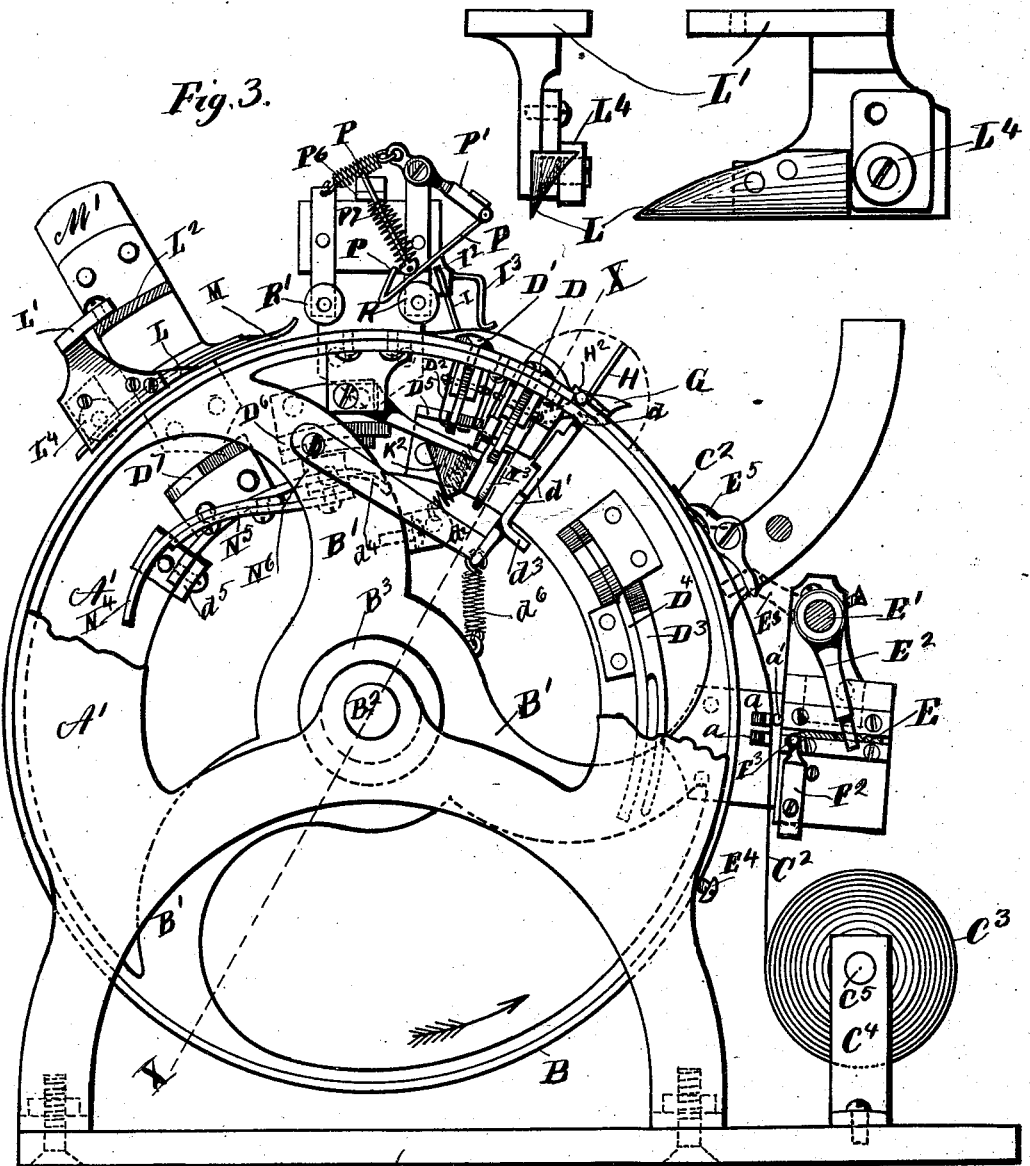

(No Model.) 6 Sheets—Sheet 4.
G. E. DE FREEST & G. W. WYNKOOP.
PACKET FOLDING MACHINE.
No. 377,669. Patented Feb. 7, 1888.
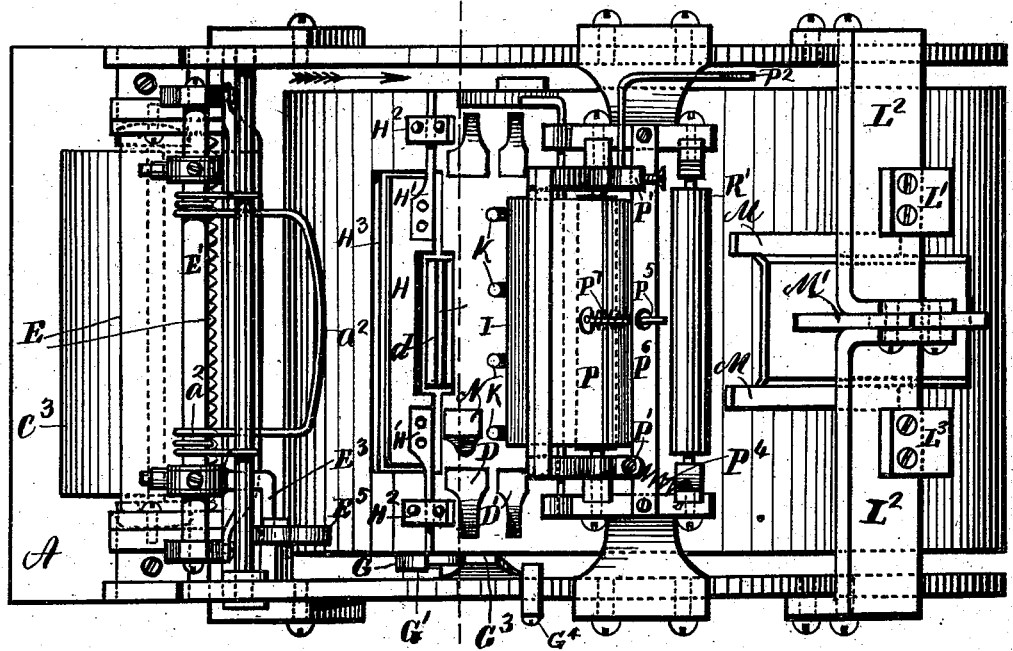
Fig. 6.
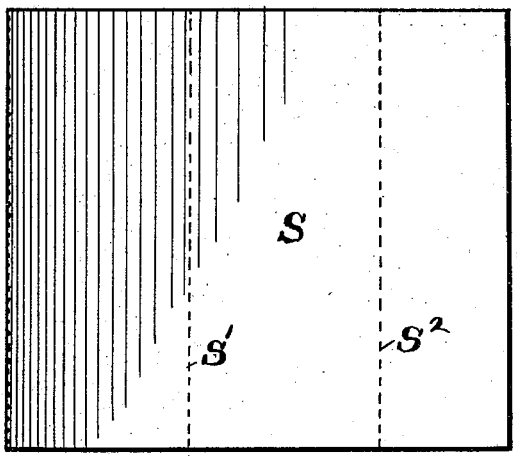
Fig. 7.
Fig. 8.
Fig. 9.
Fig. 10.
Fig. 12.
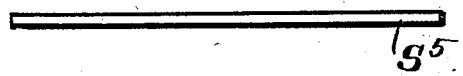
Fig. 11.
Witnesses:
John T. Booth
Reinhardt Heller
Inventors.
George E. De Freest
George W. Wynkoop
by Geo. Aurocher
atty (No Model.) 6 Sheets—Sheet 5.

G. E. DE FREEST & G. W. WYNKOOP.
PACKET FOLDING MACHINE.

No. 377,669. Patented Feb. 7, 1888.

Witnesses:
John I. Booth
Reinhardt Heller

Inventors.
George E. De Freest &
George W. Wynkoop
by Geo. A. Mosher
atty.

(No Model.) 6 Sheets—Sheet 6.

G. E. DE FREEST & G. W. WYNKOOP.
PACKET FOLDING MACHINE.

No. 377,669. Patented Feb. 7, 1888.

Witnesses:
John J. Booth
Reinhardt Heller

Inventors.
George E. De Freest &
George W. Wynkoop
by their attorney

UNITED STATES PATENT OFFICE.

GEORGE E. DE FREEST AND GEORGE W. WYNKOOP, OF TROY, NEW YORK.

PACKET-FOLDING MACHINE.

SPECIFICATION forming part of Letters Patent No. 377,669, dated February 7, 1888.

Application filed October 21, 1886. Serial No. 216,826. (No model.)

*To all whom it may concern:*

Be it known that we, GEORGE E. DE FREEST and GEORGE W. WYNKOOP, residents of the city of Troy, in the county of Rensselaer and State of New York, have invented certain new and useful Improvements in Packet-Folding Machines; and we do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

Our invention relates to improvements in packet-folding machines; and it consists of the novel construction and combination of parts, hereinafter described, and pointed out in the claims.

The objects of the several parts and combinations are fully set forth in connection with the following description, the general object of the invention being to fold a sheet of paper or similar material upon a small quantity of fine or powdered substance inclosed therein to form a small powder-packet, like or similar to those employed by physicians in dispensing medical powders.

Figure 1:
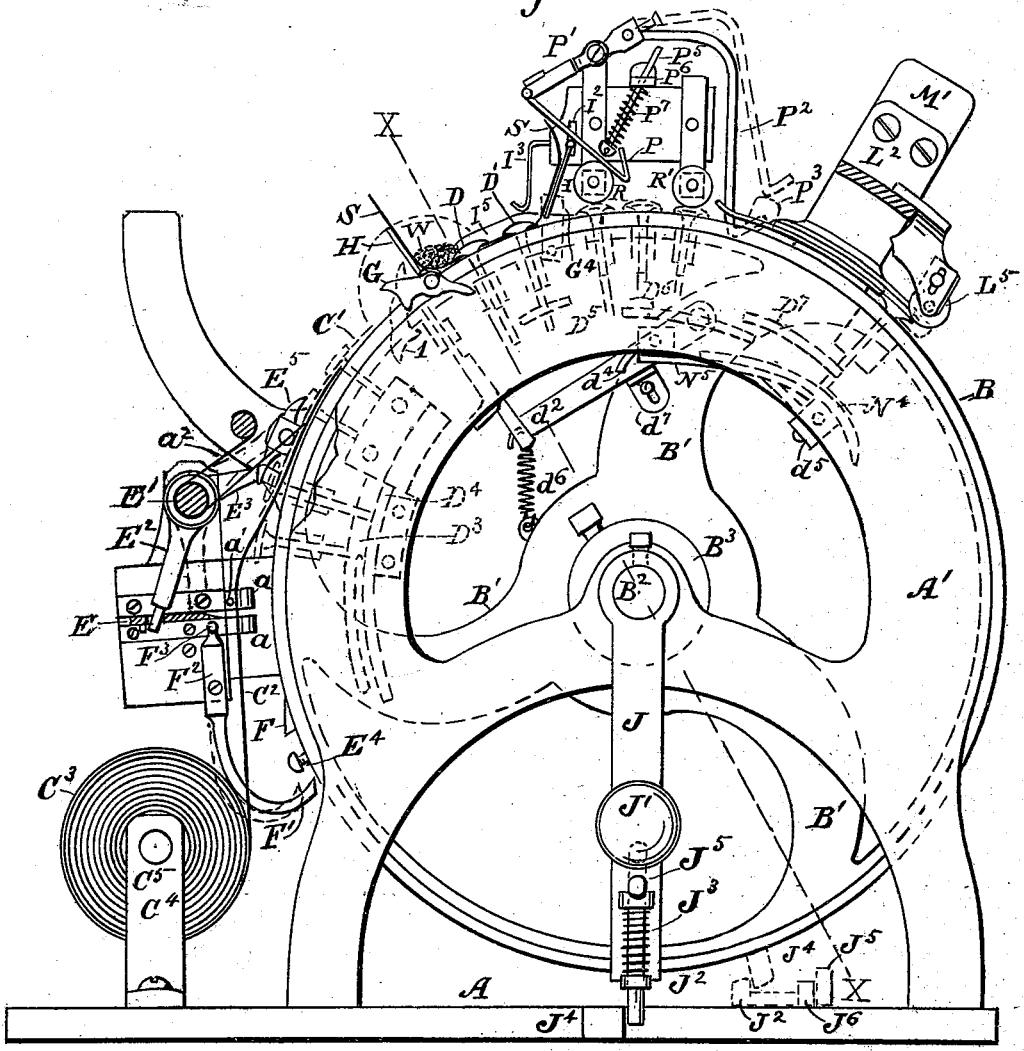
Figure 13:
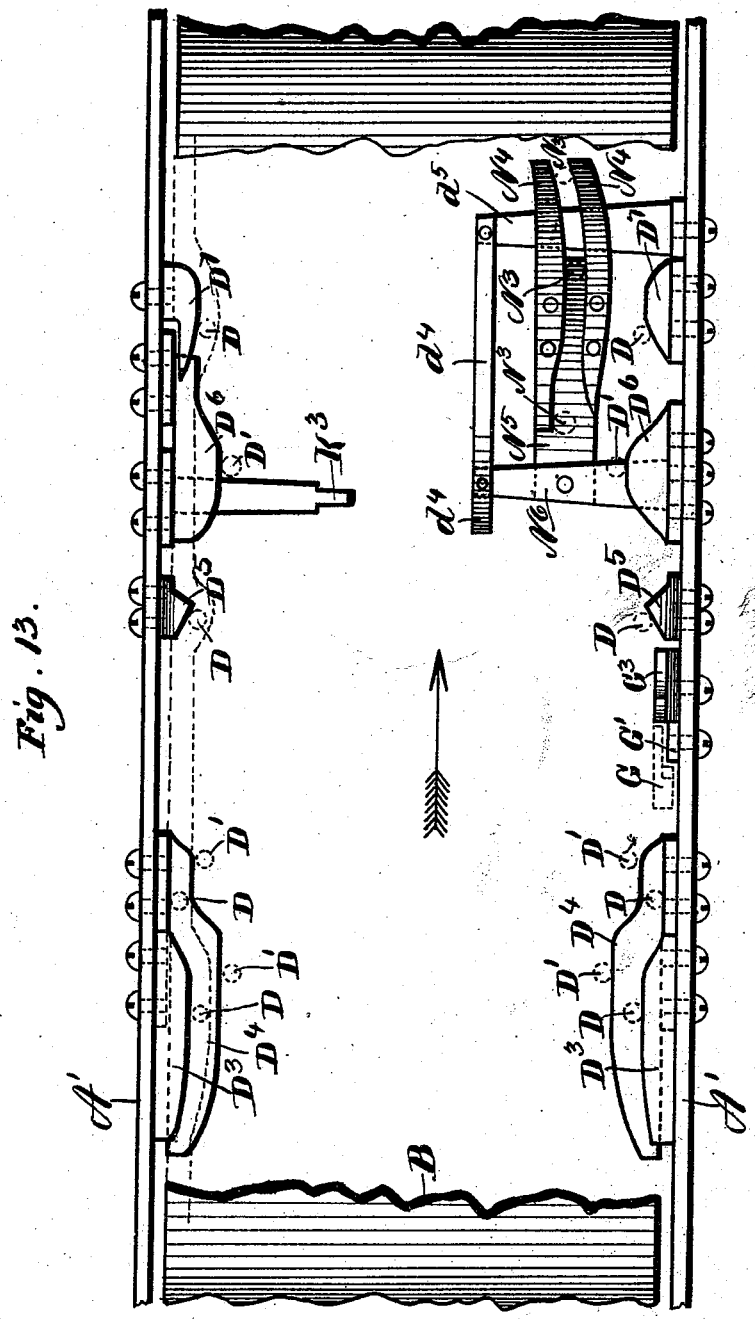
Figure 14:
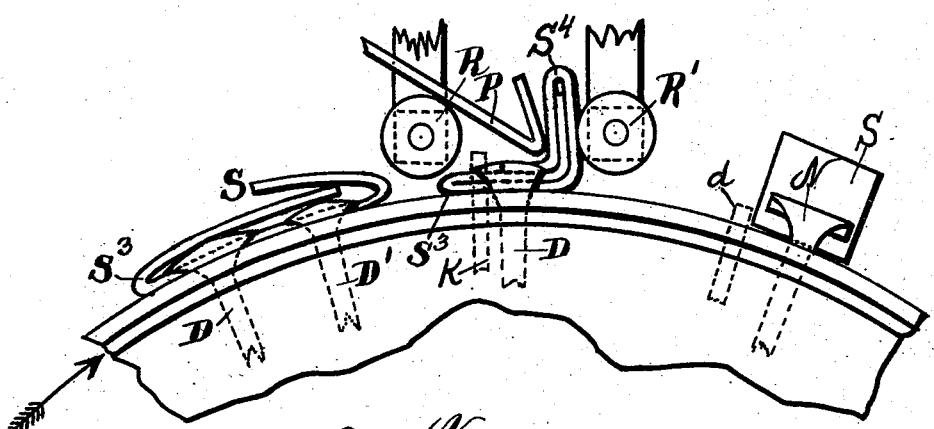
Figure 15:
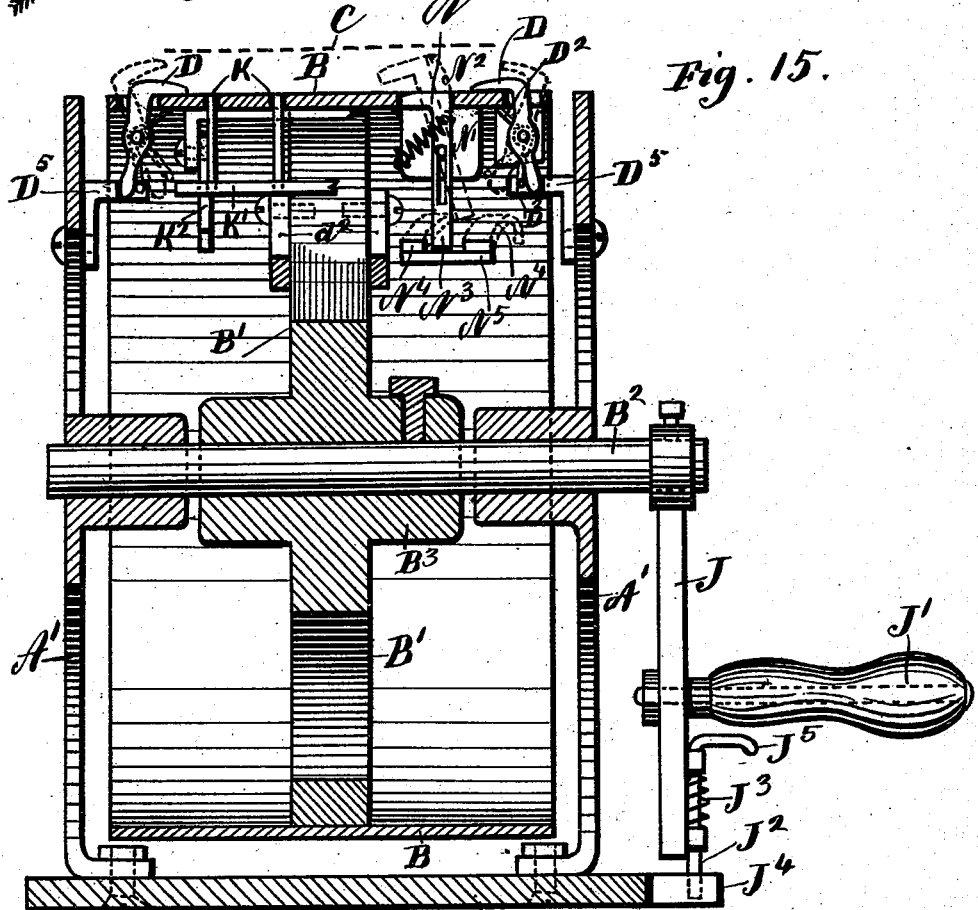

Figure 1 of the drawings is a side elevation of our improved machine, certain parts being removed. Fig. 2 is an enlarged view of a portion of the same. Fig. 3 is a side elevation of the side opposite to that shown in Fig. 1, with a portion of the frame broken away to better show the interior. Figs. 4 and 5 are respectively end and side views of an end-folding mechanism detached. Fig. 6 is a top plan view of the machine, as shown in Figs. 1 and 3, except that the frame is not shown broken and the paper is removed. Fig. 7 is a plan view of a sheet of paper or similar material of the desired shape to form a packet. Figs. 8, 9, 10, 11, and 12 illustrate the different stages in the process of folding the sheet, and will be more fully explained hereinafter, Fig. 12 showing, as the last stage, the end folds of the packet and the end-folding mechanisms. Fig. 13 is a top plan view of the frame and stops or cams secured thereto, which serve to direct the movements of the mechanisms traveling with the table. (Not shown in this figure.) Fig. 14 is a side elevation of a part of the device, showing the position of the packet relatively to the folding mechanisms during different stages of the process of folding the packet. Fig. 15 is a section taken on broken line $x$ $x$ in Figs. 1, 2, and 6, looking to the right, and in Fig. 3 looking to the left.

The table and frame are provided with co-acting devices—such as clamps, guides, rolls, cams, stops, and trips—for retaining, folding, and releasing said paper, as hereinafter fully described. The feeding device is also provided with means for perforating the paper strips and tearing off sheets where marked suitably to form the packets.

A is the bed-plate of the machine, and A' the frame which supports the carrying-table B. We have shown the table cylindrical in form and revoluble upon axle $B^2$, being connected with hub $B^3$, Fig. 15, by radial arms or spokes B'.

We do not wish to be limited to any particular form or line of movement of the table, as any well-known form of carrying-table may be employed.

The frame may be of any convenient form to support the devices coacting with complemental devices upon the moving table. We have shown the frame provided with an annular rim on each side of the table, extending upward to about the same height and corresponding with the table in circumferential size and form. The standards $C^4$, secured to the base-plate, support by a mandrel, $C^5$, a paper strip, $C^2$, in the form of a roll, $C^3$. The strip is passed through an opening between the bar $a$ and the bar or rod $a'$, and carried up so that its end rests upon the table, as shown in Figs. 1 and 3, where it is held by the spring $a^2$, Figs. 1 and 6, (not shown in Fig. 3,) until the retaining-clamps D D' grasp it and cause it to partake of the motion of the table which travels in the direction of the arrows. The clamps are pivoted upon suitable hangers on the lower side of the table and rest in slots in the table, Fig. 15. They are actuated by springs $D^2$ and controlled by cams or lugs $D^3$, $D^4$, and $D^5$, located at desired intervals on the frame. Before the clamps reach the paper to engage therewith the latter is weakened by perforations or cuts produced by the vibratory serrated knife E. The knife is vibrated by a rock-shaft, E', provided with an arm, $E^2$, which engages with the knife, and an arm, $E^3$, projecting out to or near the carrying-table, where it will be tripped by trip $E^4$, which forces the points of the knife into or through the paper, weakening the same, so that under tension it will tear easily and along the line of perforations.

One end of the lever $E^5$, pivoted to the frame, broken away at this point, rests upon arm $E^3$, and is elevated by the movement last described, while the other end is depressed to or near the table, to be engaged and raised by the same trip, $E^4$, which forces the arm $E^3$ down again and withdraws the knife to the position shown by the solid lines, the limit of vibration being indicated by the dotted lines, the function of lever $E^3$ being to give the knife a positive backward movement.

As shown in the drawings, the knife is acted upon more than one-half of a revolution of the table in advance of the engagement of the clamps with the paper. As the revolution of the table carries the clamps past the cams $D^3$ and $D^4$, they are thrown up from the table and back from the paper, as shown by the dotted lines in Figs. 1 and 15, so that when the lower arms of the clamps slide from the cams the clamps are forced by their actuating-springs $D^2$ down upon the paper, and, pressing it firmly upon the surface of the table, retain it and cause it to partake of the motion of the table. This position is shown by the second series of dotted lines in Fig. 1, a portion of the paper being also shown by dotted lines C' within the clamps. Then, as the table advances, it unrolls the roll of paper, winding it upon the table until the trip F, fixed upon the table, trips the arm F' of lever $F^2$, pivoted upon a fixed support and carrying upon its other arm a presser-bar, $F^3$, which acts to press the strip of paper so tightly against the bar $a$ as to detain the strip until the sheet S is torn off, being torn at the line of indentations or perforations, the limit of vibration being shown by dotted lines. When the sheet is thus separated, the line of indentations is somewhat farther on or above the point or line where the spring $a^2$ presses the paper. As soon as the trip has passed the arm F', the latter is released and the pressure removed, the table sliding along under the strip, which is held in place by the spring $a^2$, as before described. As the table advances in its revolution it takes with it the sheet S. The lever G, pivoted upon the table and occupying about the position shown by dotted lines 1, strikes at its lower end the trip G', fixed upon the frame, which forces the lever to about the position shown by the solid lines. As this is the position of the machine we have chosen for the drawings, the other parts of the machine occupy at this time the respective positions shown by the solid lines.

The lever G is fixed upon the axle H', which may be a rod extending transversely across the table, rotative in the bearings $H^2$, fixed one upon each side of the table; or the axle may be in two parts riveted to one side and edge of the apron or hinged leaf H, as shown. The hinged leaf is adapted to rest in a depression or well, $H^3$, in the table, so that its exposed side is then about flush with the surface of the table. It follows, therefore, that the leaf H will partake of the movements of the lever G, and will be thrown up to the position shown by the solid lines, which position is about radial to the cylindrical table and take with it that side of the paper sheet just torn from the strip. The sheet will then occupy the position shown by the heavy solid line S. The other side, which is the one on the right, as seen in Figs. 1 and 2, was lifted from the table by the apron I, which extends transversely of the table, and is secured to a pivoted rod adapted to slide and rotate in slots $I^2$ in supports fixed to the machine-frame, one on each side of the table. The pivoted bar is also provided with cam-engaging arm $I^3$, adapted to engage with the cam $I^5$, fixed upon the table. The solid lines show the arm $I^3$ lifted by cam $I^5$, on which it will ride until the end of the leaf H passes under the apron, hereinafter more fully explained, the latter having been lifted from the table to the position shown by the solid lines.

In Fig. 6 the apron is shown still further lifted, so that it will be seen projecting beyond the parts above it. As the leaf H is shown in a position about right angular to the surface of the table and inclined considerably from a vertical position, the sheet is given a trough-like shape convenient to receive the powder W, as shown, which is deposited therein by hand or from a hopper, as desired.

It is apparent that the carrying-table should be retained in the position shown by the solid lines long enough for the powder to be deposited on the sheet, and we have provided means for stopping the table at the exact place required. The axle $B^2$, which supports and moves the table, is provided with a crank, J, fixed thereon, and having a handle, J', by which the table is moved. The crank is also provided with a slide-bolt, $J^2$, actuated by spring $J^3$ and adapted to come in contact with stop $J^4$, projecting from the bed-plate A, at the exact point required to stop the table in the desired position. After the powder has been deposited on the sheet, the slide-bar is lifted by its handle $J^5$ above the stop and the table set in motion. As soon as the slide-bolt has passed the stop, the handle $J^5$ is released, whereupon the spring forces the slide-bolt down again in a position to engage the stop at the proper time for depositing the powder upon the next sheet. It is apparent that the slide-bolt may be secured to the table itself, or secured to the bed-plate in position to engage a stop upon the crank or table, as shown by dotted lines in Fig. 1, where the stop $J^4$ is indicated as fixed to the table and the slide-bolt lies on the bed A and passes through a staple, $J^6$, the point end of the bolt being turned up to catch the stop $J^4$ as the table revolves. Thus constructed, the bolt may be drawn back to release the table, causing a slight backward movement of the latter; or the bolt may be so made that by turning the handle sidewise down on the bed the catch on the end of bolt is also turned down out of the way. The lower end of the lever G, which was acted upon by the trip G', may be designated as the "heel" and the other end as the "toe." The heel is made thicker than the toe, and the trip G', which is riveted at the holes $G^2$ to the rim of the frame A', (broken away,) is adapted to engage with the heel, but not with the toe, of the lever; but the trip $G^3$ is so far offset from the frame as to engage with and trip the thinner toe of the lever, which it does just as the table is stopped, as above described, and as shown in the drawings.

The action of trip $G^3$ upon the lever is to change it from the position shown in solid lines to that indicated by dotted lines 2, which forces the leaf H forward on the course indicated by the curved dotted line, thereby folding the sheet upon itself and inclosing the powder, the sheet being folded along the dotted line S', Fig. 7, and producing the fold $S^3$, Figs. 8, 9, and 10. As the table advances the folded-down edge of the leaf and sheet pass under the lifted edge of apron I, the other edge of the sheet being forced by the apron down upon the leaf to form the fold $S^4$, Figs. 9 and 10, the latter fold also passing under the apron. The parts continue to advance in this position until the heel of lever G strikes the trip $G^4$, secured to the frame, which throws the leaf up and back again, so that it falls back into its well $H^3$ in the table.

The trip $G^4$ is shown by dotted lines in Figs. 1 and 2 and by solid lines in Fig. 6. It projects inward from the frame over the path of lever G, which passes under it as it is tripped. The position of the lever just after engagement with trip $G^4$ is shown by dotted lines 3 in Fig. 2, the corresponding position of the leaf being shown by dotted lines H, in which position it has lifted the apron I to the position shown by dotted lines $I^4$. After the leaf has passed by the apron falls by gravity to the table again. The sheet containing the powder and having both edges folded down may now be termed a "packet;" but just before the first fold of the sheet is released by the return movement of the leaf, caused by the engagement of the lever with trip $G^4$, the clamps D are opened by cams $D^5$, to receive the folded edge, and, passing by said cams just as the lever engages with trip $G^4$, the springs close them down upon the top of the folded edge, thus changing the position of clamps D from that shown at the left of the rolls R R' to that shown between the rolls in Fig. 14. The packet then passes under the first press-roll R, which presses down and fixes the folds. As the packet passes under the first roll, the pins K are forced up through corresponding slots in the table to about the position shown by dotted lines in Figs. 2 and 14, lifting the fold $S^4$ and causing it to pass up over the second press-roll, R', as shown in Fig. 14. The pins are secured to cross-bar K', which is secured at or near each end to an arm, $K^2$, pivoted to hangers secured to the lower side of the table. One of the arms is adapted to engage with a lug, $K^3$, projecting from the frame A', by which the pins are forced up through the table, as described. The device is partly shown in Fig. 15, the other and similar part extending to the other side of the table being broken away to better show other devices. At about the same time that the lifter acts to lift the fold the clamps D' engage with the cams $D^6$, which open the clamps and release the packet from their grasp, and they remain idle until brought into action for the next packet. As the table advances and the clamp D approaches the roll R', the released fold $S^4$ rides the roll, and is forced over by it onto fold $S^3$ to produce the fold $S^5$.

Since the clamp D only includes the two plies forming the fold $S^3$, it is necessary to provide some means for keeping the upper ply of fold $S^4$ down upon the other plies, or it would not be inclosed within the fold $S^5$. We provide for this purpose a spring-controlled cam-operated pusher, P, pivoted upon one end of lever P', fulcrumed upon standards projecting up from frame A', the other end of one lever having an arm, $P^2$, adapted to engage with a cam fixed upon the table, and shown by dotted lines $P^3$, the other arm having a controlling spring, $P^4$. The rod $P^5$, adapted to slide in slotted support $P^6$, is actuated by spring $P^7$, to keep the fold-pusher P down upon the packet, whereby it acts to push the upper and loose ply within the fold $S^5$, as shown in Fig. 14. The packet then passes under press-roll R', which gives it the fold $S^5$. (Shown in Fig. 10.)

Figs. 8, 9, and 10 are end views of the packet, and represent the plies considerably exaggerated in thickness.

Figs. 11 and 12 represent a side edge view of fold $S^5$ slightly exaggerated in thickness.

Various devices may be employed for folding over the ends of the packet.

In Fig. 12 we have indicated two devices, one at each end. The pointed folder L, similar in form to a soil-plow, is secured to or forms part of leg L', which is secured to the cross-bar $L^2$, attached to frame A'. The point of the folder L passes under the end of the packet, lifting it from the table, and as the folder advances it folds the end of the packet over onto the guide-plate M, which is secured by shank M' to the cross-bar $L^2$, substantially as shown. At the other end we have indicated by dotted lines in Fig. 12 the movements of cam-operated lever N. (Shown fully in Figs. 6 and 15.) The lever N is similar in form to clamps D D'. It is centrally fulcrumed upon pin N', passing through hangers $N^2$, secured to the lower side of the table. The fulcrum-pin passes through a slot in the lever, as shown in Fig. 15, and the lower end, $N^3$, of the lever is adapted to engage with a lifting and tilting cam, N⁵ N⁴, fixed upon frame A', partly shown by an end view in Fig. 15 and separately shown by plan view in Fig. 13, also in Figs. 12 and 3 by side elevations. The arm N⁶, secured to the frame, supports the lifting-cam N⁵, which is shown riveted or screwed upon it, and the tilting cams N⁴ are secured to or integral with cam N⁵. As the lower end, N³, of folding-lever N, in advancing with the table, strikes the cam N⁵ at about the position shown by the first dotted circle N³ on the left in Fig. 13, it is forced upward or lifted, and when it strikes the inner cam, N⁴, it is tilted, so that when it reaches the position indicated by the next dotted circle N³ in Fig. 13 it occupies the position shown by dotted lines in Fig. 15, having traveled over the path indicated by the dotted arrow in Figs. 15 and 12. When it passes by the lifting-cam, it drops, and in passing to the third dotted circle N³, Fig. 13, it is forced by the tilting cams back to the position shown by solid lines in Fig. 15 and by dotted lines in Figs. 1 and 2.

It will be seen from an inspection of Fig. 2 that just as the lever-arm N³ strikes the lifting-cam N⁵ the arms of clamps D strike the cams D⁷, so that the ends of the packet are released from the clamps just as the packet ends are raised by the end-folders. After the folding-lever has folded the end over the guide-plate M and just as it drops off the lifting-cam N⁵ it reaches the press-roll L⁵, as shown partly by dotted lines in Figs. 1 and 2. The packet is then caught by the roll and the end closely folded down. The roll L⁵ is like the roll L⁴, and is secured to hanger L³.

To prevent the packet from slipping back on the table after it is released from the clamps, we provide what may be termed a "packet-pusher," which is forced up through the table immediately behind the packet, and forces the packet along before it beneath the guide-plates M and press-rolls L⁴ and L⁵. The pusher may be of any convenient form—as a bar, d, secured at each end to supports d', secured to one end of arms d², which are pivoted at their other ends to the table or a projection therefrom, as spoke B'. One of the supports d' is provided with a lug, d³, adapted to engage with the cam d⁴, supported at one end by the fixed arm N⁶ and at the other end by the fixed arm d⁵, Fig. 13. It will be observed in Fig. 2 that this cam is located to act upon the pusher continuously as it passes between the guide-plates M and rolls L⁵ L⁴, and is of sufficient length to keep the pusher above the surface of the table, as shown by dotted lines, from the time that the packet is released from clamps D until the last press-rolls have acted upon it and finished the operation of forming the packet, after which the packet is removed from the table by gravity or otherwise, and the springs d⁶ draw the pusher down against adjustable stop d⁷ and into its containing-slot in the table to the position shown in Fig. 6. The table may then be revolved until the retaining-clamps again advance to and seize upon the paper strip, as before described.

It is not new in itself to perforate, indent, or cut a strip of paper transversely, whereby sheets may be torn off as required, and any of the well-known methods or devices heretofore employed for this purpose may be used in connection with our folding-machine.

We do not wish to be limited to any particular form or shape of the various parts employed to make up the complete machine.

We do not wish to be limited to any particular method of operating the retaining-clamps, as they may be operated by hand or by any of the well-known devices for actuating and controlling levers.

The individual cams may be united in one continuous cam, having a groove or track in which the arms of the clamps are adapted to travel, substantially as shown by dotted lines in Fig. 13, said groove actuating as well as controlling said clamps, substantially as the folding-lever N is actuated and controlled, in which case the clamps could be made of some elastic or yielding material to compensate for any irregularities in the surfaces of the cam-groove.

It will be readily understood that the surface of the table between the packet-retaining clamps may be somewhat depressed when desired to receive the packet, whereby it is more securely held in position and more easily forced under the press-rolls; or the rolls may be provided with yielding bearings, such as are in common use.

The word "cam" is used generically in the claims to cover trips and actuating-lugs.

What we claim as new, and desire to secure by Letters Patent, is—

1. In a packet-folding machine, in combination with a carrying-table, spring-clamps carried by the table, and a series of fixed cams extending under the table and constructed and arranged to open said clamps together at certain stages of operation and some of them at other stages of operation, substantially as and for the purposes described.

2. In a folding-machine, a carrying-table provided with a hinged leaf, H, having a lever, G, connected therewith, in combination with tripping devices G' and G³, fixed to the frame, the parts being so constructed that the tripping devices severally engage each with a different end of said lever, substantially as set forth, for the purposes specified.

3. In combination with a carrying-table provided with retaining-clamps and a cam, an oscillatory sheet-lifting apron, I, which is vertically movable between fixed supports and operated by contact with cam, substantially as set forth and described.

4. In combination with a carrying-table provided with cam I⁵, the movable lifting-apron I, provided with bent arm I³, and fixed slotted supports, substantially as and for the purposes set forth.

5. In combination with pusher P, carried by pivoted levers P', provided with arm P², a spring-rod adapted to bear against the pusher, one or more press-rolls, and a carrying-table provided with a cam to engage with arm P², substantially as described, for the purposes set forth.

6. In a packet-folding machine, the combination, with a carrying-table, of retaining-clamps, a presser-roll, and a cam-operated lifting device, as pins K, movably secured to said table, substantially as and for the purpose described.

7. In combination with a carrying-table, folding devices N, movably secured to the table and provided with retaining-springs, and fixed cams $N^4$ $N^5$, constructed to lift folders N and bring them to inclined positions, substantially as set forth and described.

8. In combination with the moving carrying-table of a folding-machine, a pushing device consisting of a bar, $d$, secured to supports $d'$, carried by pivoted arms $d^2$, and a fixed cam, $d^4$, in position to raise the pusher through an opening in the table, substantially as set forth, for the purpose specified.

9. In combination with a carrying-table having a trip, $E^4$, a perforating-knife which is movable in fixed bearings, a pivoted lever, $E^5$, and a rock-shaft provided with two projecting arms, one of which engages with the perforating-knife and the other with said lever, substantially as and for the purposes described.

10. In combination with a carrying-table provided with a trip, F, a fixed bar, $a$, an adjacent presser-bar carried by pivoted levers $F^2$, provided with an arm constructed to engage with trip F, substantially as set forth and described.

11. In combination with the carrying-table provided with a hinged folding leaf and means, substantially as described, for lifting it, a movable bolt constructed and arranged to stop the movement of the table when the leaf has been swung upward, substantially as and for the purpose set forth.

In testimony whereof we have hereunto set our hands this 13th day of October, 1886.

GEORGE E. DE FREEST.
GEORGE W. WYNKOOP.

Witnesses:
GEO. A. MOSHER,
ORIN GAMBELL.